July 25, 1967   W. A. SPECK   3,333,158
PANELBOARD STRUCTURE WITH ADJUSTABLE SUPPORT MEANS
Filed Nov. 19, 1965   2 Sheets-Sheet 1

WITNESSES:
John L. Chopp
James F. Young

INVENTOR
Willis A. Speck
BY
William A. Elchik
ATTORNEY

July 25, 1967 W. A. SPECK 3,333,158
PANELBOARD STRUCTURE WITH ADJUSTABLE SUPPORT MEANS
Filed Nov. 19, 1965 2 Sheets-Sheet 2
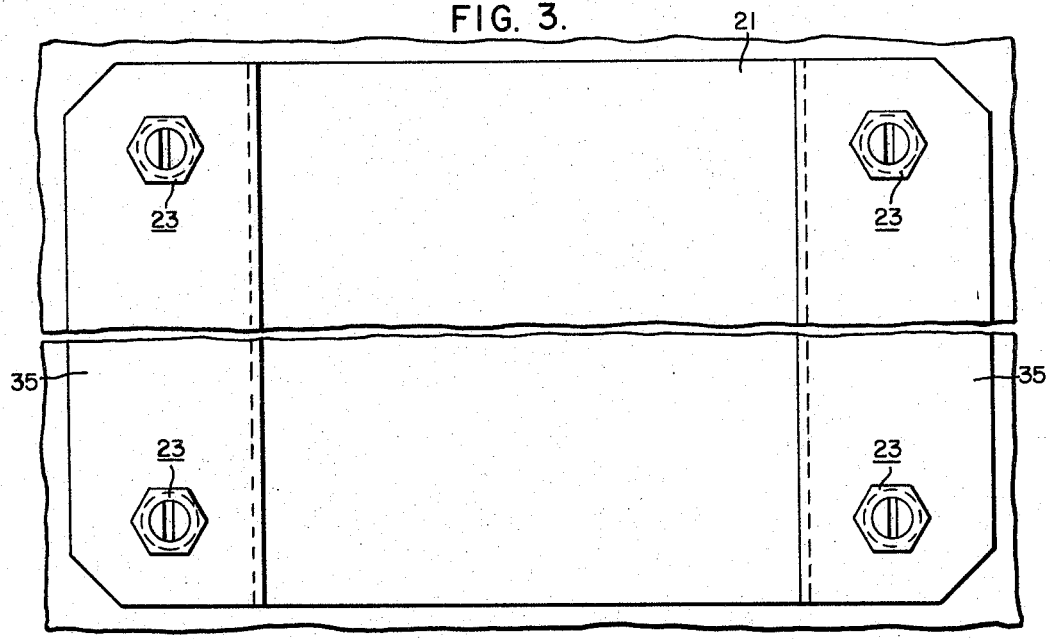
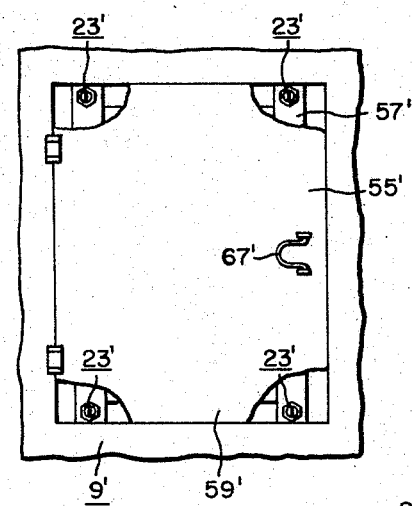
FIG. 5.
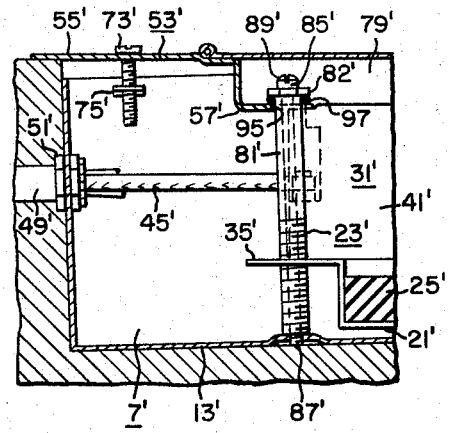
FIG. 6.
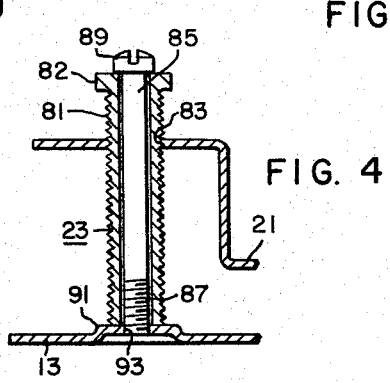
FIG. 4

United States Patent Office 3,333,158
Patented July 25, 1967

3,333,158
PANELBOARD STRUCTURE WITH ADJUSTABLE
SUPPORT MEANS
Willis A. Speck, Trumbull, Conn., assignor to Westinghouse Electric Corporation, Pittsburgh, Pa., a corporation of Pennsylvania
Filed Nov. 19, 1965, Ser. No. 508,771
7 Claims. (Cl. 317—120)

ABSTRACT OF THE DISCLOSURE

A panelboard structure comprising adjustable supporting means for supporting a supporting pan in an enclosure and locking means for fixing the position of the supporting pan in the adjusted supported position thereof.

---

At wall-type installations of panelboards or load-centers, an opening is generally provided in a wall to receive the receptacle part of the panelboard so that the outer cover structure of the panelboard will be flush with the outer wall surface. After the completion of the finish plastering, the receptacle part of the panelboard that is disposed in the wall opening is sometimes spaced or tilted relative to the outer planar plastered wall surface. When the cover structure is moved into the mounted position, the trim part of the cover structure engages the outer wall surface, and the shield part that is below the openable door of the cover structure should engage the front surfaces of the enclosed circuit breakers to seal off the internal part of the receptacle. In order to compensate for the spacing and/or misalignment and to permit the trim structure to engage the outer wall surface while the internal shield part engages the outer surfaces of the circuit breakers, it is desirable to provide means for adjusting the supported position of the circuit breakers in the receptacle part of the enclosure and means for fixing the position of the circuit breakers in the adjusted supported position thereof.

Accordingly, an object of this invention is to provide an enclosure for electric control devices with improved means for adjustably supporting the control devices within the enclosure and with locking means for fixing the position of the control devices in the adjusted supported position thereof.

Another object of this invention is to provide an improved enclosure having adjustable support means comprising a support member for supporting control devices in the enclosure and a shield that cooperates with the housings of the enclosed control devices to provide a pocket under the enclosure cover, which support means comprises means accessible in said pocket for adjusting the position of the support member and for locking the support member in the adjusted position thereof.

A more general object of this invention is to provide an improved panelboard structure that is relatively easy to assemble and install.

The features that are considered characteristic of the invention are set forth in particular in the appended claims. The invention itself, however, both as to structure and operation, together with additional objects and advantages thereof, will be best understood from the following detailed description when read in conjunction with the accompanying drawings.

In said drawings:

FIG. 3 is a partial plan view of certain of the internal parts of the enclosure of FIGS. 1 and 2;

FIG. 4 is a sectional view of one of the support means illustrated in FIGS. 2 and 3;

FIG. 5 is a partial plan view, with parts broken away, of a flush-mounted panelboard structure illustrating another embodiment of this invention; and FIG. 6 is a partial sectional view similar to FIG. 2, with parts broken away, of the panelboard structure illustrated in FIG. 5, which figure is shown on an enlarged scale relative to FIG. 5.

Figure 1:
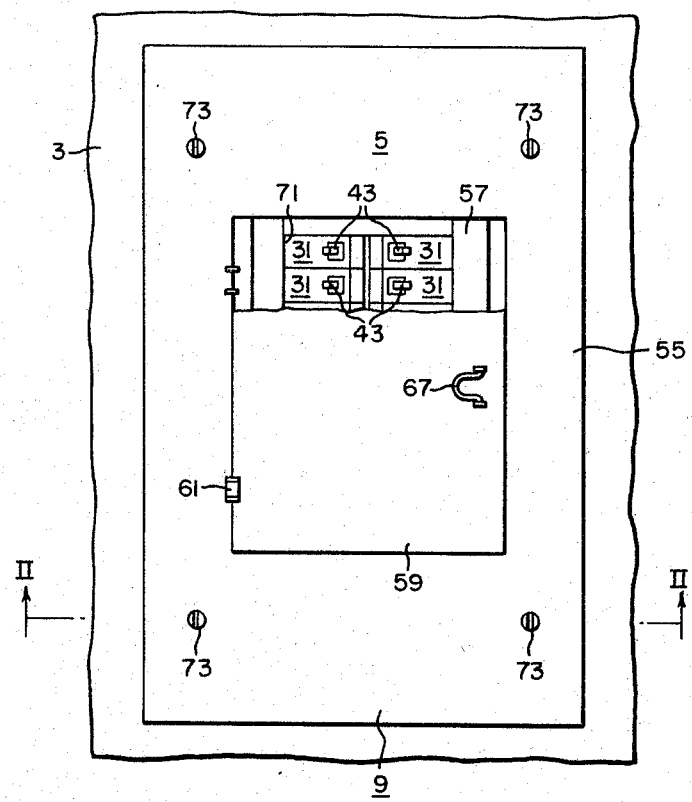
FIGURE 1 is a plan view, with parts broken away, of a flush-mounted panelboard structure constructed in accordance with principles of this invention.
Figure 2:
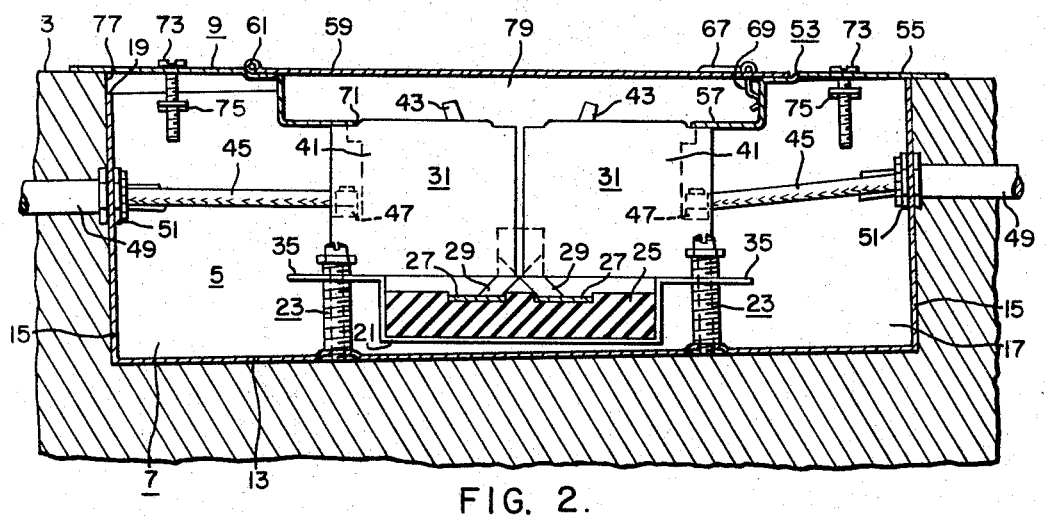
FIG. 2 is a sectional view, on an enlarged scale relative to FIG. 1, taken generally along the line II—II of FIG. 1.

Referring to FIGS. 1 and 2, there is shown therein part of a wall 3 of a building, and a panelboard or load-center structure 5 supported on the wall 3. The panelboard 5 comprises a receptacle 7 and a cover structure 9.

The receptacle 7 comprises a sheet metal structure comprising a generally planar base 13. Two end walls 15 and two side walls 17 (only one of the side walls being seen in FIG. 2) extend perpendicularly up from the base 13 to form an opening at the front of the receptacle 7. As can be seen in FIG. 2, the side wall means 15, 17 terminate at an end part 19 that surrounds the opening formed at the front of the receptacle 7.

A sheet metal support pan member or support 21 is supported on the base 13 in a spaced relationship from the base by means of support means comprising a plurality of support structures 23. An insulating support block 25 is supported on the support 21 and conducting bars 27 are supported on the insulating support block 25. A plurality of rigid stab-type conducting members 29 extend from each of the bus bars 27 to enable electrical connection between the bus bars 27 and clip-on type terminal structures of electric control devices that are herein disclosed as circuit interrupters or circuit breakers 31. The support member 21 is provided with oppositely disposed shelf parts 35 for supporting the outer or load-ends of the circuit breakers 31. As can be seen in FIG. 1, a plurality of the circuit breakers 31 are mounted in the receptacle 7. Each of the circuit breakers 31 is supported at the line end thereof on the associated shelf 35 of the support 21. Each of the circuit breakers 31 is supported at the line end thereof on the associated stab conductor 29 that engages between oppositely disposed clip members of a conducting clip-on terminal structure of a type that is well known in the art and that is used to electrically connect the circuit breaker with the associated bus bar 27. Each of the circuit breakers 31 is a molded case type circuit breaker since it comprises an insulating housing 41 for housing the circuit-breaker mechanism. Each of the circuit breakers 31 is provided with an insulating handle 43 that extends out through a suitable opening in the front of the circuit breaker for operating a pair of contacts that are disposed inside of the associated housing 41. Each of the circuit breakers 31 is a circuit breaker of the type disclosed in the patent to F. L. Gelzheiser, Patent No. 3,110,786, issued Nov. 12, 1963. References may be made to the above-mentioned Gelzheiser patent for a specific description of the circuit breakers.

As can be seen in FIGS. 1 and 2, two rows of circuit breakers 31 are supported in the receptacle 7 on the support 21 with the circuit breakers of the opposite rows being positioned in a close end-to-end relationship. A separate load conductor 45 is connected to the load end of each of the circuit breakers 31 by means of a well known type of solderless terminal connecting structure 47. Two metal conduits 49 are disposed in suitable openings in the wall 3, and they are secured to the end walls 15 of the receptacle 7, at openings in the end walls 15, by means of securing means 51. The securing means 51, in each case, comprises two threaded members that are threaded together and onto the metal conduit 49 at opposite sides of the associated end wall 15 of the receptacle. The load lines 45 are extended out from the receptacle 7 through the conduits 49.

The cover structure 9 comprises a sheet metal member 53 formed to provide a generally planar trim part 55 and a lower shield part 57. A planar sheet metal cover or door 59 is pivotally supported on the member 53 by means of hinges 61. The shield part 57 extends around the perimeter of the generally rectangular opening that is covered by the door 59. A handle member 67 is provided on the outside of the door 59. A resilient latch member 69 (FIG. 2) is fixed to the underside of the door 59 to bias against the member 53 to provide friction in the closed position of the door 59. The shield 57 is provided with an opening 71 therein, which opening 71 is generally rectangular for receiving the front parts of the insulating housings 41 of the circuit breakers 31 to permit access to the handles 43 when the door 59 is in the open position.

The cover structure 9 is connected to the receptacle 7 by means of four screws 73 that are disposed at the four corners of an imaginary rectangle. Each of the screws 73 passes through a suitable opening in the trim 55 and is threaded into a tapped opening in a suitable bracket 75 that is welded or otherwise fixedly secured to the side wall means of the receptacle 7.

As can be seen in FIG. 2, an opening 77 is provided in the wall 3 for receiving the receptacle 7. Suitable securing means such as screws or nails may be used to secure the receptacle 7 to the wall 3 in the opening 77 in a manner well known in the art. The receptacle 7 is disclosed as being tilted relative to the wall surface in that the end wall on the left (FIG. 2) is disposed lower into the wall opening 77 than the end wall on the right. A reason for this tilting is that the finished plastering at many installations may not provide an even wall surface. For some installations, the receptacle 7 may not be tilted in the wall; but the receptacle may be deeper into the wall than the outer wall surface 3 such that the edge 19 of the receptacle 7 is below or spaced from the outer wall surface. With the supporting structure 23 supporting the circuit breakers 31 in a position tilted relative to the generally planar base 13 of the receptacle 7, the circuit breakers 31 are properly aligned for engaging the shield 57 of the cover structure 9 when the cover structure 8 is moved into the mounted position. During the mounting operation of the cover structure 9, the trim 55 is moved into engagement with the outer wall surface 3 and the screws 73 are fastened to the bracket 75 to draw the cover structure 9 toward the receptacle 7 to thereby mount the cover structure 9 in place. As can be seen in FIG. 2, the shield 57 engages the outer or front surfaces of the insulating housings 41 sealing off the internal part of the receptacle 7. The door 59, member 53, and insulating housings of the circuit breakers 41 provide a pocket 79 into which the handles 43 extend. The handles 43 are accessible, in the pocket 79, for manual operation when the door 59 is open. The improved support structures 23 are provided to adjustably support the support 21 and circuit breakers 31 such that the position of the supported circuit breakers 31 can be adjusted so that the front parts of the housings 41 of the circuit breakers will properly engage the shield 57 to seal off the internal part of the receptacle 7 even though the receptacle 7 is tilted or spaced from the outer wall surface. As was previously described, the support 21 is supported on support means comprising the four support structures 23 (FIGS. 2 and 3) each of which support structures 23 cooperates with a corner support part of the support 21. As can be seen in FIG. 4, each of the support structures 23 comprises a tubular support post 81 having external threads thereon. The support post 81 is provided with a head part or collar part 82 at the upper end thereof. The support 21 comprises four support parts in proximity to the four corners thereof each of which support parts is provided with a separate tapped opening 83 for cooperating with a support post 81. Each of the support posts 81 is threaded into the associated taped opening 83 and the support post engages the base 13 to support the associated corner or support part of the support 21 on the base 13 in a spaced relationship from the base 13. Each of the support structures 23 comprises an elongated bolt 85 having a threaded part 87 at one end thereof and a bolt head 89 at the other end thereof. The base 13 of the receptacle 7 is provided with a generally raised part 91 for supporting the support member 81 and a tapped opening 93 for receiving the threaded part 87 of the bolt 85. The raised part 91 permits the bolt 85 to extend slightly out from the bottom of the tapped opening 93 without extending past the generally planar back part of the base 13. Each of the bolts 85 may be screwed down into the associated tap opening 93 of the base 13 such that the bolt head 89 thereof will engage the support member 81 to force the member 81 against the base 13 providing a frictional engagement to prevent rotation of the member 81. Thus, the member 81 is locked in the adjusted position.

The support structures 23 permit ready adjustment of the support 21 to thereby provide that the front parts of the circuit breakers 31 will engage the shield 57. When it is desired to adjust, for example, one of the corners of the support 21, the bolt 85 is loosened approximately one-half of a turn to move the bolt head 89 out of locking engagement with the upper end of the support post 81. Thereafter, the support post 81 may be rotated whereby the external threads thereof cooperate with the tapped opening 83 to move the particular corner part or support part of the support 21 up or down depending upon the direction of rotation. When the particular support part of the support 21 is at the desired height, the bolt 85 can be tightened to again lock the support post against rotation. The other three support structures 23 can be similarly adjusted to properly position the circuit breakers 31 in the receptacle 7 in engagement with the shield 57 (FIG. 2) of the cover structure 9.

Another embodiment of the invention is disclosed in FIGS. 5 and 6. In these figures, those parts that are the same as or similar to the parts disclosed in FIGS. 1–4 are identified by the same reference characters used in FIGS. 1–4 except that the like reference characters of FIGS. 5 and 6 are primed. In the embodiment of FIGS. 5 and 6, the shield 57' is provided with four openings 95 therein and the four support posts 81' are long enough to extend through the four openings 95. The four bolts 85' are long enough to extend through the tubular support members 81' and to be threaded into the four tapped openings in the base 13. At each of the four openings 95 an O-ring resilient seal 97 is provided on the external side of the shield 57' between the shield 57' and the collar portion 82' of the support post 81' to seal off the opening 95 through which the post 81' extends. As can be seen in FIG. 5, the four support structures 23' extend through four openings in the shield 57' at the four corners of an imaginary rectangle. The four support structures 23' support the support 21' in the same manner as was hereinbefore described with reference to FIGS. 1–4. The support structures 23' are adjusted in the same manner as was hereinbefore described by rotation of the bolts 85' about one-half of a turn to unlock the support posts 81' so that the support posts 81' may be rotated to raise or lower the support 21'. When the support 21' is in the proper position, the bolts 85' can be tightened to lock the support posts 81' against accidental rotation. As can be seen in FIGS. 5 and 6, the four support structures 23' extend into the pocket 79' whereby the support structures 23' are accessible in the pocket for adjustment when the cover 59' is in the open position.

From the foregoing, it can be understood that there is provided by this invention an improved panelboard structure with improved adjustable support means for supporting a plurality of electric control devices in the panelboard such that when the receptacle part of the panelboard is spaced from or tilted relative to an outer planar wall surface the support means can be adjusted to move the housings of the control devices into engagement with a shield part of the cover structure to seal off the internal part of the receptacle. The adjustable support means which holds the support firmly in position in the receptacle requires little space for adjustment. The adjustable support means is relatively inexpensive to manufacture and assemble. The adjusted position of the support means is readily locked in place against accidental misadjustment by rotation of securing bolts that bind the support posts against rotation. In order to adjust the support, the securing bolts are merely rotated approximately one-half of a turn to unlock the support posts whereupon the support posts may be rotated to move the support up or down depending on the direction of rotation of the posts. When the support is in the proper position, the bolts are then tightened to prevent rotation of the support posts. At certain installations, the adjustable support means can be extended through the shield member into the pocket between the control devices, the shield and the door of the cover structure whereby the position of the support and control devices can be adjusted through the door opening when the door of the cover structure is in the open position.

While the invention has been disclosed in accordance with the provisions of the patent statutes, it is to be understood that various changes in the structural details and arrangement of parts thereof may be made without departing from the spirit and scope of the invention.

I claim as my invention:

1. An enclosure for electric control devices, said enclosure comprising a base plate structure and having an opening opposite said base plate structure, a support for supporting said electric control devices, support means supporting said support on said base plate structure, said support comprising a support part having an opening therein, said support means comprising a threaded post member in threaded engagement with said support part at said opening to support said support part on said base plate structure in a spaced relationship from said base plate structure, said threaded post member being rotatable to move said support part to vary the spacing between said support part and said base plate structure, and locking means comprising a locking member movable from an unlocking position to a locking position in which locking position said locking member engages said threaded post member to prevent accidental rotation of said threaded post member.

2. An enclosure according to claim 1, wherein: said support means comprises a plurality of said threaded post members, said support comprises a separate one of said support parts for each of said plurality of support members, and said locking means comprises a separate one of said locking members for each of said plurality of threaded post members.

3. An enclosure according to claim 1, said threaded post member comprising a tubular member, said base plate structure having an opening therein, said locking member comprising a bolt member comprising a threaded part and a bolt-head part, said bolt member extending through said tubular threaded post member and being in threaded engagement with said base plate structure in said opening in said base plate structure, said bolt member being rotatable to be moved axially on said base plate structure between said unlocking and locking positions, and upon movement of said bolt member to said locking position said bolt-head part being drawn against said tubular threaded post member to draw said tubular threaded post member against said base plate structure to prevent rotation of said tubular threaded post member.

4. An enclosure according to claim 3, wherein: said support means comprises a plurality of said tubular threaded post members, said support comprises a separate support part for each of said tubular threaded post members with each of said support parts having an opening therein receiving the associated tubular threaded post member, said locking means comprises a separate one of said bolt members in each of said tubular threaded post members, said base plate structure having a separate opening therein for each of said bolt members, and each of said bolt members being in threaded engagement with said base plate structure at the associated opening in said base plate structure.

5. An enclosure for electric control devices, said enclosure comprising a receptacle structure, said receptacle structure comprising a base plate structure and having a receptacle opening opposite said base plate structure, a support for electric control devices of the type having handle means for manual operation of the control devices, support means supporting said support on said base plate structure spaced from said base plate structure, a cover structure comprising a trim part and an openable door, said cover structure comprising a shield part under said door, said shield part having a first opening means therein, means supporting said cover structure in a first position in proximity to said receptacle structure over said receptacle opening with said shield part in close proximity to said electric control devices and with said handle means extending through said first opening means in said shield part, said door movable relative to said trim part to an open position to provide access to a pocket between said shield part and said door to thereby provide access to said handle means, said shield part having a second opening means therein, said support comprising a support part having an opening therein, said support means comprising a threaded post member engaging said base plate structure and extending through said opening in said support part in threaded engagement with said support part at said opening in said support part to support said support part on said base plate structure in a spaced relationship from said base plate structure, said threaded post member extending through said second opening means in said shield into said pocket where said threaded post member is accessible for operation when said door is open, said threaded post member rotatable to move support part to vary the dimension between said support part and said base plate structure, and locking means comprising a locking member accessible in said pocket when said door is open and movable from an unlocking position to a locking position in which locking position said locking member engages said threaded post member to lock said threaded post member to prevent accidental rotation of said threaded post member.

6. An enclosure according to claim 5, said threaded post member comprising a tubular member, said base plate structure having an opening therein, said locking member comprising a bolt member comprising a threaded part and a bolt-head part, said bolt member extending through said tubular threaded post member and being in threaded engagement with said base plate structure in said opening in said base plate structure said bolt member being rotatable to be moved axially on said base plate structure between said unlocking and locking positions, upon movement of said bolt member to said locking position said bolt-head part being drawn toward said base plate structure to bind said tubular threaded post member between said bolt-head part and said base plate structure to prevent rotation of said tubular threaded post member, and said bolt-head part being positioned in said pocket where said bolt-head part is accessible to permit rotation of said bolt member when said door is open.

7. An enclosure according to claim 6, said tubular threaded post member comprising a collar portion positioned in said pocket on the outside of said second opening means in said shield part, and resilient sealing means disposed between said collar portion and said shield part to seal said second opening means in said shield part.

References Cited

UNITED STATES PATENTS

| 2,036,044 | 3/1936 | Hammer | 317—119 |
| 2,282,520 | 5/1942 | Jackson | 317—119 |
| 2,287,684 | 6/1942 | Jackson et al. | 174—57 |
| 2,599,695 | 6/1952 | Christensen | 317—119 |
| 3,202,881 | 8/1965 | Carlyle | 317—120 |

ROBERT K. SCHAEFER, *Primary Examiner.*

H. O. JONES, *Assistant Examiner.*